United States Patent

Johnson

[11] Patent Number: 5,823,417
[45] Date of Patent: Oct. 20, 1998

[54] LASER PRESSURE FOOT

[76] Inventor: Jeffrey Don Johnson, 500 Crestview, Parsons, Kans. 67357

[21] Appl. No.: 677,094

[22] Filed: Jul. 9, 1996

[51] Int. Cl.[6] .................................................. B23K 26/08
[52] U.S. Cl. ..................................... 228/44.3; 219/121.63
[58] Field of Search ................................. 228/157, 212, 228/44.3; 219/121.63; 112/240, 236

[56] References Cited

U.S. PATENT DOCUMENTS

| | | | |
|---|---|---|---|
| 161,087 | 3/1875 | Applegate et al. | 112/240 |
| 1,658,915 | 2/1928 | Baynard | 112/240 X |
| 4,872,940 | 10/1989 | Strum et al. | 219/121.63 X |
| 5,550,345 | 8/1996 | Meier et al. | 219/121.63 |
| 5,609,288 | 3/1997 | Johnson | 228/157 |

*Primary Examiner*—Kenneth J. Ramsey
*Attorney, Agent, or Firm*—Thomas P. Mahoney

[57] ABSTRACT

Pressure feet for association with a laser welder head to apply pressure as closely as possible to workpieces adjacent the welding zone whereby maximum weld penetration and quality are achieved. Welding pressure feet includes roller means engagable with the uppermost portions of the workpiece serving to define a desired width of welding zone. The provision of inclined roller means facilitates the achievement of a welding zone of minimal width.

14 Claims, 2 Drawing Sheets

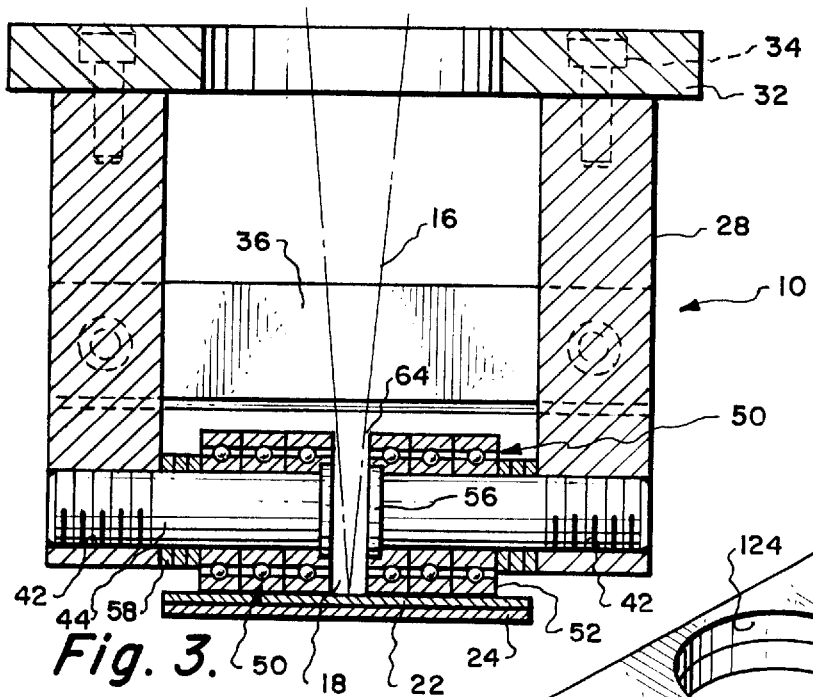
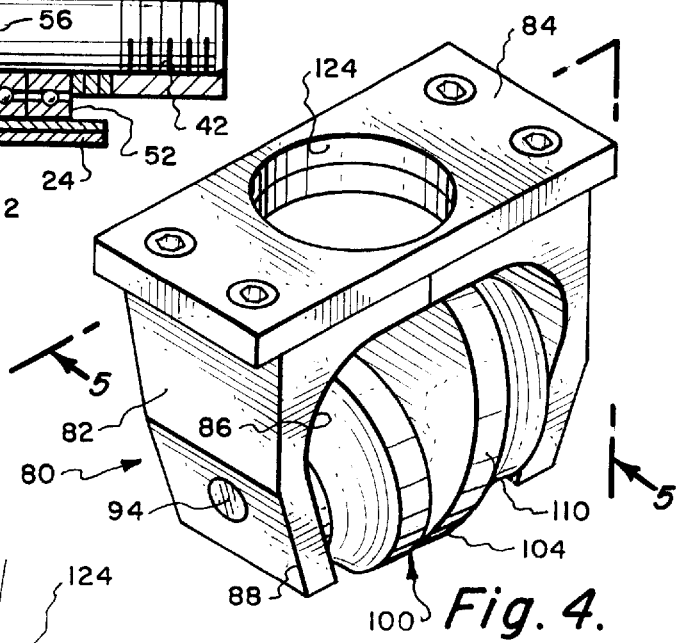
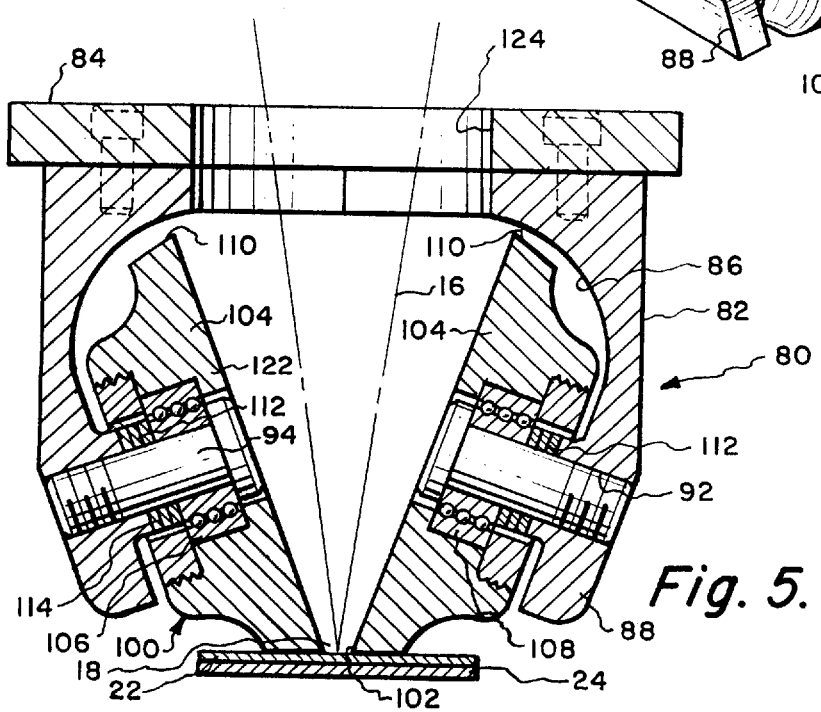

LASER PRESSURE FOOT

This invention relates to a pressure foot for utilization in conjunction with a laser welder. The pressure foot is particularly designed for utilization in conjunction with a laser welder which traverses an elongated welding zone and is intended to apply sufficient pressure to superimposed workpieces, such as metallic foils, in order that a satisfactory weld between the superimposed foils may be achieved.

BACKGROUND OF THE INVENTION

At the present time, pressure is applied to workpieces being welded by a laser welder through the utilization of an elongated pressure foot which presses down on the uppermost surface of the workpieces being welded and the laser welding head creates a series of weldments by traversing the workpiece adjacent the laser foot.

Conventional laser feet of this type have been found to be unsatisfactory because, being elongated, they tend to apply pressure unevenly along the length of the weld pattern. Moreover, the foot must be raised and lowered repeatedly if more than one weld pattern is to be created.

In any event, the resulting weld pattern tends to be characterized by inequality in the individual welds since the elongated pressure foot, being statically oriented with respect to the weld pattern, cannot possibly apply equal pressure to the uppermost surface of the workpieces along their lengths and the length of the weld pattern.

OBJECTS AND ADVANTAGES OF THE INVENTION

It is a primary object of the invention to provide a laser welding foot which is secured adjacent the laser welder housing so that the laser beam is juxtaposed immediately to the pressure foot which moves simultaneously with the creation of the weld pattern.

Another object of my invention is the provision of a laser pressure foot of the aforementioned character which includes spaced pairs of roller means located on opposite sides of the laser welding zone and having its extremities adjacent the welding zone juxtaposed to the weld pattern as closely as possible in order to apply the maximum pressure to the workpieces as the laser weld is created. Another object of my invention is the provision of a pressure foot for association with a laser welder which includes roller means movable in conjunction with the laser welder housing, thus applying pressure to the workpiece immediately adjacent the welding zone to achieve the optimum weld between the contiguous areas of the workpiece.

Another object of the invention is the provision of a pressure foot of the aforementioned character wherein the roller means is constituted by a plurality of rollers which traverse the upper surface of the uppermost element of the workpiece to apply maximum pressure to the area of the workpiece immediately adjacent the welding zone.

A further object of the invention is the provision of a pressure foot wherein the rollers are adjustable to permit the width of the welding zone to be increased or diminished to accommodate the welding beam.

An additional object of my invention is the provision of a laser welder of the aforementioned type wherein the roller means are constituted by a plurality of roller bearings whose outer races engage the surface of the uppermost of the workpieces immediately adjacent the welding zone. Major adjustment of the width of the welding zone can be accomplished by the removal of one or more of the roller bearings.

An additional object of the invention is the provision of a pressure foot of the aforementioned character in which adjustment of the roller means can be accomplished by the utilization of adjustment shims or washers so that relatively minor adjustments in the width of the welding zone can be accomplished by removal of one or more of the washers.

An additional object of my invention is the provision of a pressure foot wherein the roller means includes a pair of angularly oriented rollers which apply pressure to the surface of a workpiece and which are characteristically able to define a narrower welding zone than the previously described rollers.

A further object of my invention is the provision of a pressure foot of the aforementioned character wherein the rollers are angularly oriented and have angular, perimetrical contact surfaces thereupon which engage the surface of the workpiece. Because of the angular orientation of the contact surfaces and the angular orientation of the rollers themselves, restriction of the width of the welding zone to a minimum is achieved, thus insuring the creation of a laser weld which is of uniform and optimum character.

Other advantages and objects of the invention will be apparent from the following specification and the accompanying drawings.

BRIEF DESCRIPTION OF THE DRAWINGS

FIG. 3 is a transverse sectional view taken on the broken line 3—3 of FIG. 2;

FIG. 4 is an isometric view of an alternative embodiment of the invention; and

FIG. 5 is an enlarged vertical sectional view taken on the broken line 5—5 of FIG. 4.

FIRST EMBODIMENT OF THE INVENTION

Figure 1:
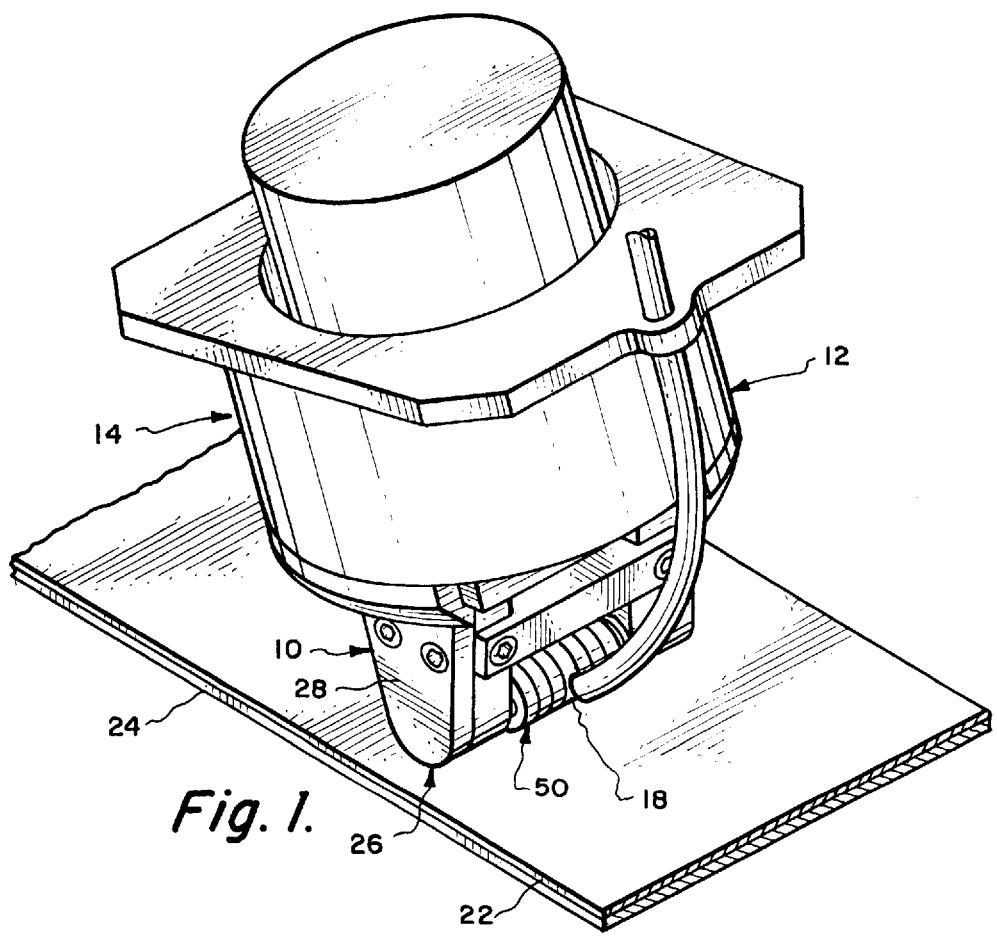
FIG. 1 is an isometric view showing a pressure foot of the invention mounted in association with the housing of a laser welder.
Figure 2:
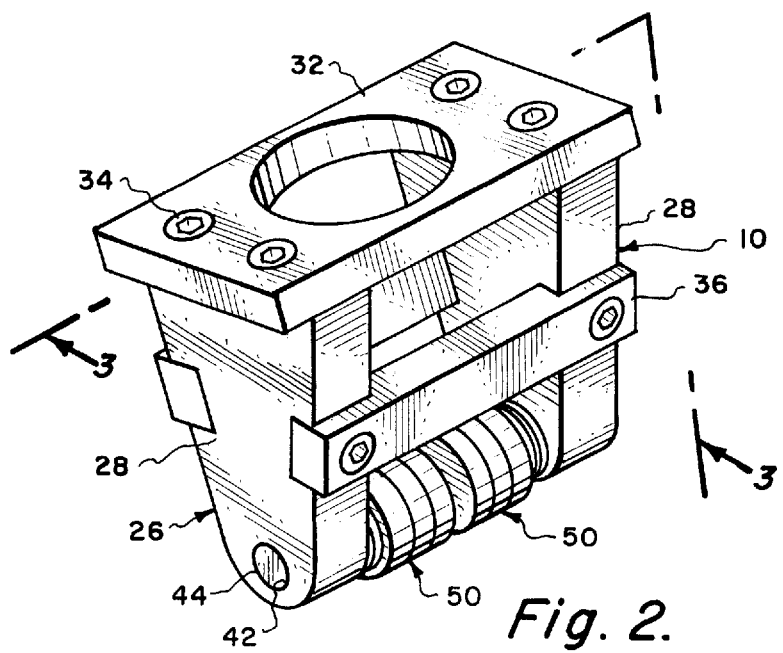
FIG. 2 is an enlarged isometric view showing the pressure foot dismounted from the laser welder housing.

Referring to the drawings, and particularly to FIGS. 1 to 3 thereof, I show a pressure foot 10 constructed in accordance with the teachings of the invention and securable for conjoint operation with a laser welding device 12 having a housing 14.

The laser welding device 12 is designed to emit a laser beam 16 which impinges on the uppermost of two or more work-pieces in a welding zone 18 to secure the uppermost two of the workpieces in operative relationship with each other. The workpieces in the present disclosure are constituted by sheets 22 and 24 of metallic foil of gauges encompassed in the range of 0.002 to 0.008 inch.

Of course, the pressure foot 10 can be utilized in conjunction with sheets of metal having greater or lesser gauges than those mentioned hereinabove by adjustment of the laser welder to produce a welding beam 16 of sufficient power to accomplish the welding of the respective workpieces.

The first embodiment 10 of the pressure foot of the invention includes a mounting frame 26, said mounting frame including depending mounting arms or plates 28 which are connected at their upper extremities to a mounting plate 32 securable, in a manner not shown in the drawings to the lower extremity of the laser beam housing 14. The securement of said upper extremities of said mounting arms 28 can be by bolts 34 or similar expedients.

Secured to the mounting arms 28, intermediate their extremities, are braces 36 which maintain the mounting arms 28 in precise, spaced relationship with each other.

Formed in the lower extremities of the mounting arms 28 are bores 42 which threadedly receive the opposite extremities of shafts 44 for mounting roller means 50 in spaced relationship with each other.

Each of the roller means 50 consists of a plurality of roller bearings 52 mounted for rotation on the respective shafts 44 and retained in operative relationship with said shafts by heads 56 on said shafts.

In the embodiment 10, a plurality of roller bearings 52 is mounted on each of the shafts 44 conjointly with adjustment spacer washers or shims 58. Although a plurality of roller bearings 52 is shown as mounted on the respective shafts 44, a single large bearing may be utilized and adjustment of the inner, confronting extremities of the roller means can be accomplished by removal of or addition of spacer washers or shims 58 from or to the shafts 56.

Consequently, the outer races of the roller bearings 52 serve as engagement surfaces for contact with the sheets 22 and 24, as best shown in FIG. 3 of the drawings. As the laser head 12 traverses the uppermost of the sheet 24, the pressure foot is carried along to define the welding zone 18 and to insure the close contact of adjacent surfaces of the sheets 22 and 24 during the welding operation creating an elongated welding zone and achieving laser welds in the elongated welding zone which are of the optimum physical characteristics desired.

As will be noted from FIG. 3 of the drawings, the optimum width of the welding zone 18 defined by the inner extremities of the roller means 50 is dictated by the spacing between the extremities of the roller means and, more particularly, as indicated at 64 in FIG. 3 of the drawings. Therefore, the width of the welding zone 18 will always be determined by the width of the entry passage for the welding beam 16 defined at 64 between the upper extremities of the roller means 50.

THE SECOND EMBODIMENT OF THE INVENTION

Referring to FIGS. 4 and 5 of the drawings, I show a pressure foot 80 which operates, generally, in the manner of the first embodiment 10.

The pressure foot 80 includes depending mounting arms 82 which are secured at their upper extremities to a mounting plate 84. The mounting arms have arcuate inner surfaces 86 which are subtended by lower, angularly oriented portions 88. Angularly oriented bores 92 are threadedly engaged by the outer extremities of headed mounting shafts 94 which support opposed roller means 100 to define a welding zone 102.

The roller means 100 include angularly oriented rollers 104 mounted on the shafts 94 by means of roller bearings 106. The roller bearings are mounted in counter bores 108 in the rollers 104 and adjustment washers or shims 112 are interposed between the inner faces of the roller bearings and a boss 114 on each of the mounting arms 82. The perimetrical contact surfaces 110 of each of the rollers 104 are provided with inclined surfaces which, as best shown in FIG. 5 of the drawings, enable the inclined rollers 104 to impinge effectively on the upper surface of the uppermost workpiece 24 to provide for a maximum application of pressure to said upper surface.

The number of washers or shims 112 can be reduced or increased to correspondingly enlarge or reduce the welding zone 18 as the width of the zone is dictated by various requirements of the welding pattern produced by the laser welder 12. The width of the welding zone can be reduced to the minimum acceptable by the impingement of the welding beam on the uppermost sheet 24 because the inclination of the rollers 104 eliminates the possibility of the faces 122 of the rollers 104 obstructing the passage of the beam which passes through an opening 124 provided in the mounting plate 84 and corresponding surfaces of the upper extremities of the mounting arms 82.

The importance of being able to adjust the width of the welding zone to a minimum extent, as achieved by the pressure foot 80, cannot be exaggerated because the less the width of the welding zone, the greater proximity of the pressure exerted by the pressure foot 80 to the welds created by the welding beam 16 which insures maximum and desirable weld control and penetration.

Although I have described specific embodiments of the invention, the variations in the basic concept illustrated by the presentation of two embodiments is illustrative of the scope which should be afforded to the accompanying claims and it is not intended that the scope of the invention be limited to specifics of the described embodiments.

I claim:

1. In a pressure applying foot for utilization in conjunction with a laser welder having a housing, the combination of: mounting means securable to said housing; first roller means on said mounting means for engagement with the upper surface of a workpiece; and second roller means on said mounting means for engagement with the upper surface of a workpiece, the extremities of said roller means defining the edges of an elongated welding zone on said workpiece for weldment by said laser welder, said roller means applying pressure to said workpiece adjacent said zone to obtain maximum engagement of elements of the workpiece during the laser welding process.

2. The pressure foot of claim 1 in which said roller means is constituted by roller bearings whose outer races engage the surface of said workpiece adjacent the welding zone.

3. The pressure foot of claim 1 or claim 2 in which each of said roller means includes a plurality of roller bearings.

4. The pressure foot of claim 3 in which one or more of said roller bearings can be removed from each of said roller means to adjust the space between the extremities of said roller means.

5. The pressure foot of claim 1 in which spacer means is provided in conjunction with said roller means to adjust the spatial relationship between the extremities of said roller means.

6. In a pressure foot for use in conjunction with a laser beam welder for welding metallic parts or workpieces, the combination of: a support frame, said support frame having first and second downwardly extending mounting arms; and roller means angularly mounted on said arms, said roller means including first and second angularly oriented rollers for applying pressure to a workpiece adjacent the welding zone of said laser beam.

7. The pressure foot of claim 6 in which said first and second mounting arms have angularly oriented portions for supporting said roller means' angular orientation with each other.

8. The pressure foot of claim 6 or claim 7 in which the lower extremities of said arms incorporate angularly oriented mounting bores for the reception of correspondingly angularly oriented shafts for mounting said roller means in angular orientation with respect to each other.

9. The pressure foot of claim 6 or claim 7 in which said roller means have angularly oriented perimeters to facilitate the pressure engagement of said workpiece by said roller means.

10. The pressure foot of claim 6 in which said roller means is adjustable to permit adjustment of said roller means toward or away from each other.

11. In a pressure foot for association with a laser welder for welding a plurality of super-imposed metallic foils in operative engagement with one another, the combination of: first and second mounting arms; first roller means mounted on said first mounting arm having its perimeter engagable with the uppermost surface of said metallic foils; second roller means having a perimeter engagable with said uppermost foil surface, said first and second roller means being positioned to define a welding zone for said welder.

12. The pressure foot of claim 11 in which said roller means is constituted by first and second rotatable rollers.

13. The pressure foot of claim 11 or claim 12 in which said pressure foot includes adjustment means for adjusting said roller means toward or away from each other.

14. The pressure foot of claim 11 in which said first and second mounting arms have lower extremities angularly inclined toward each other to orient said roller means angularly with respect to each other.

* * * * *